April 25, 1933. R. M. MORGAN ET AL 1,906,078
NUTTING MACHINE
Filed April 24, 1929 2 Sheets-Sheet 2
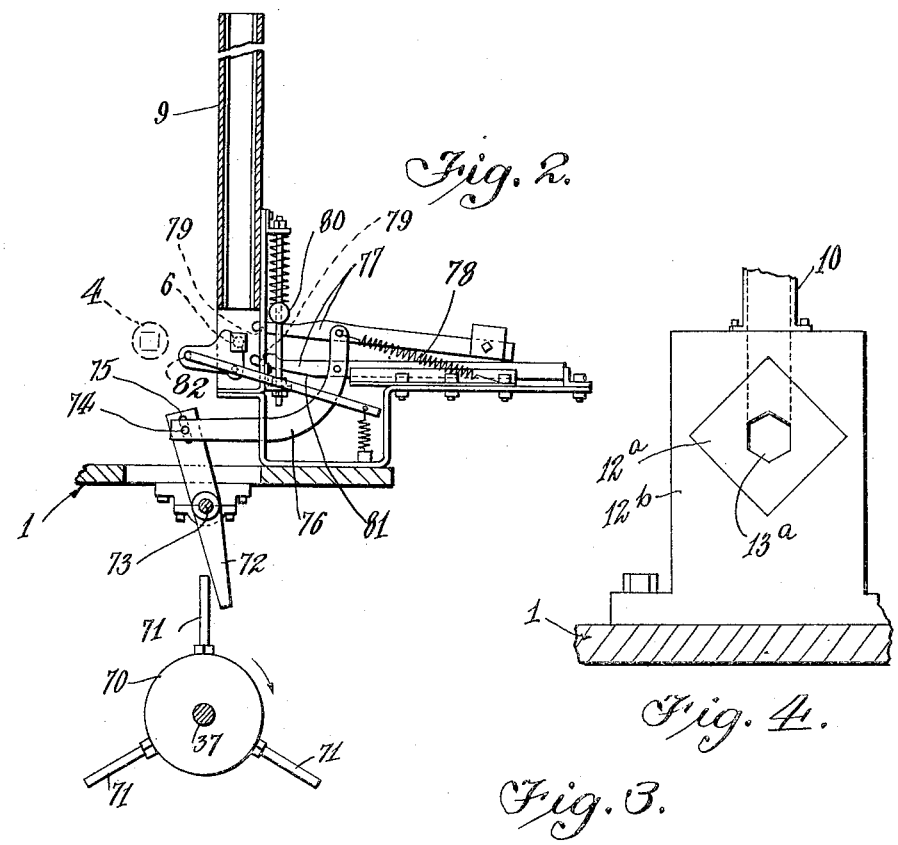
Inventors
Robert M. Morgan
Stephen W. Harden
By Lyon & Lyon
Attorneys Patented Apr. 25, 1933

1,906,078

UNITED STATES PATENT OFFICE

ROBERT M. MORGAN, OF ALHAMBRA, AND STEPHEN W. HARDEN, OF MAYWOOD, CALIFORNIA, ASSIGNORS, BY MESNE ASSIGNMENTS, TO PACIFIC COAST STEEL CORPORATION, OF SAN FRANCISCO, CALIFORNIA, A CORPORATION OF DELAWARE

NUTTING MACHINE

Application filed April 24, 1929. Serial No. 357,659.

This invention relates to nutting machines, and more particularly to a means for automatically threading nuts on bolts to a predetermined length of the threads of the bolts and to a predetermined tension of the nut on the thread of the bolts. In the threading of bolts with nuts as they are manufactured, it has heretofore been common practice to thread the nuts practically by hand on the bolts while either rapidly rotating the bolts in a rotating machine and holding the nut in position relative to the bolt so that it is threaded into position, or reversing the action to rapidly revolve the nuts and hold the bolts in position relative to the nut manually until the nut is threaded on the bolt to a predetermined extent.

In carrying out this matter of threading the nuts on bolts, it is usually necessary after the nut has been threaded on the bolt a predetermined degree to, as a separate step, rap the bolt with the nut thereon to loosen the engagement of the nut with the bolt so that it may be easily unthreaded when it is desired to use the bolt and nut assembly.

In the handling of galvanized bolts it is common practice to thread these bolts by hand due to the liability of breaking the galvanized coating on the nuts and it is necessary in this type of structure to back off the nut a few threads on the bolt after it has been threaded into position to enable the nut to be easily removed from the bolt when it is desired to use the same.

An object of this invention is to provide a machine for automatically threading nuts onto bolts after the nut and bolt have been threaded and to thread the nut onto the bolt to a predetermined position, and means for reversing the direction of threading of the nut in relation to the bolt so as to unthread the nut from a tight position on the bolt to permit the same to be easily removed when it is desired to use the bolt.

Other objects and advantages of this invention it is believed will be apparent from the following detailed description of a preferred embodiment thereof as illustrated in the accompanying drawings.

In the drawings:

Figure 2 is a sectional view taken substantially on the line 2—2 of Figure 1.

Figure 3 is a sectional view taken substantially on the line 3—3 of Figure 1.

Figure 4 is a sectional view taken substantially on the line 4—4 of Figure 1.

Figure 1:
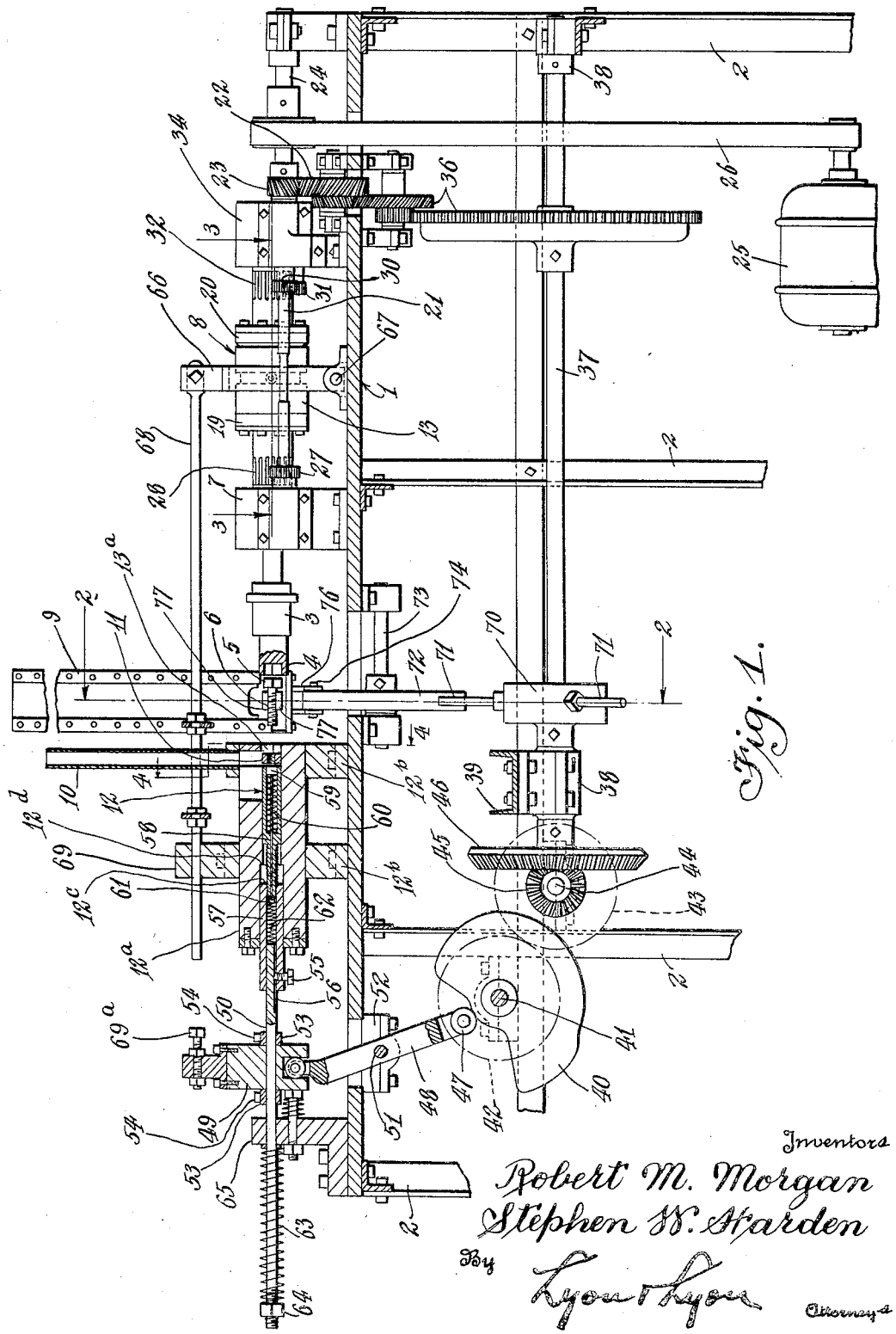
Figure 1 is a side elevation partly in vertical section of the nutting machine embodying this invention.

In the preferred embodiment of this invention illustrated in the accompanying drawings, 1 indicates a frame which is provided with supporting legs 2. Rotatably supported by the frame 1 is a mandrel 3 which is provided with a chuck 4 adapted to grip the head 5 of the bolt 6. The mandrel 3 is journaled in a bearing 7 secured to the frame 1 and is driven through a friction reversing clutch 8 in a manner which will hereinafter be described. The bolts 6 are positioned within a feed chute 9 in position to be delivered one at a time to the chuck 4 of the mandrel 3. A feed chute 10 is provided for receiving the nuts 11 which are to be screw-threaded on the bolt 6 and for positioning the nuts 11 in relation to the bolts 6 and to a yieldable plunger 12.

The plunger 12 is yieldably urged in position through a means which will hereinafter be specifically described to advance the nut 11 in position to engage the end of the bolt 6 and urge the bolt 6 longitudinally of the mandrel 3 until the head 5 of the bolt fits within the chuck 4. The mandrel 3 being rotated screws the bolt 6 onto the nut 11. As the nut 11 is moved forwardly, it is held from rotation in the socket $13^a$ of the box $12^a$. After the nut 11 has been screw-threaded on the bolt 6 a predetermined distance, the direction of rotation of the mandrel 3 is reversed, causing the nut 11 to be slightly unscrewed, or released from its grip on the bolt 6, leaving the bolt and nut assembled so that they may be easily taken apart when it is desired to use the same.

The plunger 12 is slidably mounted in a box $12^a$. The box $12^a$ is mounted in guides $12^b$ to permit the box $12^a$ to slide longitudinally with the plunger 12 when the shoulder $12^c$ engages the shoulder $12^d$ of said box.

The mandrel 3 is keyed to a drive cone 13, as illustrated at 14, and the drive cone 13 is provided with two beveled engaging faces 15 and 16 which are adapted to be engaged with the correspondingly beveled faces 17 and 18 of forward and reverse drive cones 19 and 20 respectively. The cones 19 and 20 are driven in reverse directions through a countershaft 21, which is in turn coupled with the pulley shaft 24.

The pulley shaft 24 is driven from a drive motor 25 through a belt 26. The forward driving cone 19 is directly connected through a pinion 27 which meshes with gear teeth 28 formed on the longitudinal extension of the cone 19. An end thrust bearing 29 is provided between the bearing support 7 and the end face of the shank or longitudinal extension of the drive cone 19. The reverse drive cone 20 is driven from a pinion 30 secured to the countershaft 21 and meshing with an idler pinion 31. The idler pinion 31 engages teeth 32 formed on the extending shank of the reverse drive cone 20. An end-thrust bearing 33 is provided between the end of the shank of the reverse drive pulley 20 and the bearing housing 34. A spring 35 is mounted within a recess formed in the reverse drive cone 20 in position to yieldably urge the driving cone 13 into operative engagement with the forward driving cone 19, and it is only when the driving cone 13 is moved against the tension of the spring to a position to operatively engage the reverse driving cone 20 that the mandrel 3 is reversed in its direction of rotation.

Means are provided for yieldably urging the nut 11 into position to engage the end of the bolt 6 and to move the bolt 6 so that its head 5 passes into the chuck 4 of the mandrel 3, which means are preferably of the following construction;

Driven from the pulley shaft 24 through gears 23 and 22 through a train of reducing gears 36 is a feed shaft 37. The feed shaft 37 is supported in bearings 38 secured to the posts 2 and a transverse frame member 39. The feeding means are driven from the shaft 37 through a cam 40. The cam 40 is mounted on a shaft 41 supported in a bearing on a transverse member of the frame 1. The shaft 41 is driven through a gear 42 secured to the shaft 41 and meshing with a gear 43 mounted on a countershaft 44. The shaft 44 is driven through beveled gears 45 and 46 from the shaft 37.

A cam roller 47 carried by a shifting fork 48 engages the cam 40 at one end and at its opposite end engages a shifter collar 49 mounted on the plunger rod 50. The shifter fork 48 is pivotally mounted intermediate its ends with a pin 51 carried in a bearing 52 secured to the frame 1.

The collar 49 is adjustably secured to the plunger rod 50 by means of a pair of collars 53 which are adjustably secured to the plunger rod 50 by means of cap screws 54 permitting adjustment of the collar 49 longitudinally of the rod 50 to accommodate for different lengths of threads of the bolts 6. The plunger rod 50 is adjustably connected with the plunger 12 by means of a cap screw 55 which engages within a key-way 56 formed in the plunger 50. The cap screw 55 is screw-threaded in position through a cylindrical extension 57 of the plunger 12.

The plunger 12 includes an engaging rod 58 having a head 59 at its foremost end which engages the nut 11 to yieldably urge the nut 11 toward the bolt 6 as the shift collar 49 is actuated to shift the plunger rod 50 longitudinally. The yieldable rod 58 is yieldably held in position by means of the spring 60 which is secured to the head 59 at one end and at its opposite end is secured to the plunger 12. The spring 60 normally urges the head 59 backwardly from the nut 11. The opposite end of the plunger rod 58 is also provided with a head 61 which is yieldably urged forward in the recess provided in the hollow cylindrical member 57 by a spring 62. The spring 62 at its opposite end engages the end of the plunger rod 50 and the spring 62 is compressed by the longitudinal movement of the plunger rod 50 into and from the hollow cylindrical member 57. Compression of the spring 62 yieldably urges the member 58 forward to urge the head 59 outwardly into position to move the nut 11 into engagement into the socket 13$^a$ of the box 12$^a$. On further rotation of the cam 40, the shoulder 12$^c$ engages the shoulder 12$^d$ moving the box 12$^a$ longitudinally of the machine. This moves the nut 11 into engagement with the bolt 6 and moves the bolt 6 into the chuck 4 of the mandrel 3. The further forward movement of the box 12$^a$ caused by the cam 40 results in the nut 11 being screw-threaded onto the revolving bolt 6. The yieldable plunger engaging the nut 11 compensates for the feed of the nut 11 required for threads of different pitch found on bolts of different sizes or having different threads.

Means are provided for yieldably returning the plunger rod 50 to a non-operating position, which means preferably comprises a spring 63 which is mounted on the end of the rod 50 and engages at one end a nut 64 and at its opposite end the bearing support 65 of the rod 50.

Means are provided for reversing the direction of rotation of the mandrel 3 as the nut 11 is screwed onto the bolt 6 to a predetermined tension, which means are preferably of the following construction:

A shifter fork 66 is operatively connected with the cone 13 and is pivotally supported from the frame 1 as indicated at 67. The opposite end of the shifter fork 66 is secured to an actuating arm 68. The actuating arm extends longitudinally of the machine and passes through a bearing support 69. The arm 68 is actuated by means of coming in contact with a striker 69ª which is carried by the shifter collar 49. As the shifter collar 49 is moved longitudinally of the machine to shift the rod 50 to move the nut 11 into engagement with the bolt 6 and as the nut 11 is screw-threaded onto the bolt 6, the striker 69ª is yieldably urged forward until it engages the end of the arm 68.

As the nut is further screw-threaded onto the bolt 6, the striker 69ª pushes the arm 68 to shift the cone 13 against the tension of the spring 35 to engage the cone 13 with the reverse driving cone 20. The mandrel 3 is then rotated slightly to loosen the nut 11 on the bolt 6, either unthreading the nut 11 slightly from the bolt 6 or unscrewing the same one or more threads as desired.

Means are provided for feeding the bolts 6 from their position at the lower end of the chute 9 into position to be received in the chuck of the mandrel 3, which means are preferably of the following construction:

Secured to shaft 37 is a star-wheel 70 carrying a number of striker arms 71. The striker arms 71 are adapted to engage the end of a lever 72 to rotate the same around a pivot 73. The opposite end of the lever 72 is pivotally connected by means of a pin 74 mounted in a slot 75 formed in the lever 72 and secured to a curved actuating rod 76. Feed actuating rod 76 is pivotally secured to a pair of gripper fingers 77. The curved rod 76 as it is moved pulls the fingers 77 together by the fingers 77 being cammed toward each other by a yieldably urged cam roller 80 and by the lower-most of the fingers 77 traveling along its inclined surface 81 on the member 82. The jaws 79 of the fingers 77 then close around the shank of the bolt 6 as the same is in position in front of the chute 9 as viewed in Figure 2, and further movement of the fingers 77 transmits the bolt 6 from this position to a position in front of the chuck 4 of the mandrel 3.

As the arm 71 passes beyond the link 72, the spring 78 returns the fingers 77 to the position indicated in Figure 2, leaving the nut held in the chuck 4 of the mandrel 3 as the plunger 12 advances to move the nut 11 into engagement with the bolt 6. The bolts 6 are ejected from the machine after the reversal of rotation of the mandrel 3 by the head 59 as urged forwardly by the spring 62 when the plunger 12 is moved rearwardly under the influence of the cam 40 and spring 63 permits another nut 11 to fall into position to be carried forward by the plunger 12.

In ejecting the nut 11 and bolt 6 as assembled from the machine, we have found that this assembly will follow the movement of the non-revolving box 12ª and that the head of the bolt 6, especially of small bolts, will pass out of the chuck 4 of the mandrel 3. The head 59 of the mandrel 12 then under influence of the spring 60 kicks the bolt and nut assembly free from the socket 13ª of the box 12ª. The travel of the head 59 must be insufficient however to permit a second nut 11 from falling behind the head 59 and the end of the mandrel 3.

Having fully described our invention, it is to be understood that we do not wish to be limited to the details herein set forth, but our invention is of the full scope of the appended claims.

We claim:

1. In a device of the class described, the combination of means for supporting a bolt, means for supporting a nut, yieldable means for effecting relative movement of the nut and bolt to yieldably move the same into engagement, means for effecting relative rotation of the nut and bolt to screw-thread the same together, and reversible clutch means operable automatically after the nut and bolt have been threaded together a predetermined amount to reverse the relative rotation of the nut and bolt to release the grip of the nut on the threads of the bolt.

2. In a device of the class described, the combination of means for rotating a bolt, means for feeding a nut to the bolt so that the nut is screw-threaded on the bolt, and reversible clutch means operating automatically for reversing the rotation of the bolt to back the nut on the threads of the bolt after the nut has been threaded a predetermined distance on the bolt.

3. In a device of the class described, the combination of a bolt feed chute, a nut feed chute, means for gripping the bolts as fed from the chute, means for urging the nut toward the bolt, means for rotating the bolt to screw-thread the same into the nut a predetermined amount, and reversible clutch means acting automatically thereafter for effecting relative rotation of the bolt and nut to back the nut from the bolt.

4. In a nutting machine, the combination of a bolt feed chute, a nut feed chute, means for gripping a bolt fed by said chute to rotate the same, means for yieldably urging a nut fed by said chute toward the bolt, a reversible clutch operably connected with the bolt rotating means, and means controlled by the yieldable nut urging means and operable after a predetermined movement of said nut with relation to the bolt to actuate said reversible clutch to reverse the rotation of said bolt to back the nut on the bolt.

5. In a nutting machine, the combination of a bolt feed, a nut feed, means for yieldably urging a nut toward a bolt, means for gripping the bolt, the nut urging means being operable to move the nut into engagement with the bolt and to move the bolt into position to be engaged by the bolt gripping means, means for rotating the bolt to thread the same into the nut, a reversible clutch operably connected with the bolt rotating means, means controlled by the yieldable nut urging means and operable after a predetermined movement of said nut with relation to the bolt to actuate said reversible clutch to reverse the rotation of said bolt to back the nut on the bolt, and means operated by said yieldable nut urging means to eject the nut and bolt from the machine after the nut has been backed on the bolt.

6. In a nutting machine, the combination of a bolt feed, a nut feed, means for yieldably urging a nut from the feed toward the bolt to engage and move the bolt, a bolt gripping means adapted to grip the bolt as the same is moved by the nut urging means, means for rotating the bolt to thread the same to the nut, and means operating in timed relation with the threading of the bolt into the nut for reversing the rotation of the bolt to back the nut on the bolt.

7. In a nutting machine, the combination of a bolt feed, a nut feed, means for yieldably urging a nut from the feed toward the bolt to engage and move the bolt, a bolt gripping means adapted to grip the bolt as the same is moved by the nut urging means, means for rotating the bolt to thread the same to the nut, means operating in timed relation with the threading of the bolt into the nut for reversing the rotation of the bolt to back the nut on the bolt, and means for adjusting the means for yieldably urging the nut to compensate for a different length of thread on the bolt.

8. In a nutting machine, the combination of a bolt feed, a nut feed, means for yieldably urging a nut from the feed toward the bolt to engage and move the bolt, a bolt gripping means adapted to grip the bolt as the same is moved by the nut urging means, means for rotating the bolt to thread the same to the nut, means operating in timed relation with the threading of the bolt into the nut for reversing the rotation of the bolt to back the nut on the bolt, the yieldable nut urging means being provided with means for yieldably urging the nut fed as the bolt is rotated to compensate for threads of different pitch of the nut and bolt.

9. In a nutting machine, the combination of a mandrel, means for gripping and holding a bolt in advance of the mandrel, means for positioning a nut in advance of the bolt, means for feeding the nut longitudinally, means for rotating the bolt, the nut feeding means including a box mounted for longitudinal movement, means connected in timed relation with the bolt rotating means for moving the box longitudinally, a plunger mounted in the box and adapted to be yieldably urged forward to advance the nut as the box is moved forward to move the bolt in position to be gripped by the bolt rotating means, and to feed the nut longitudinally of the bolt during the threading of the bolt into the nut.

10. In a nutting machine, the combination of a mandrel, means for gripping and holding a bolt in advance of the mandrel, means for positioning a nut in advance of the bolt, means for feeding the nut longitudinally, means for rotating the bolt, the nut feeding means including a box mounted for longitudinal movement, means connected in timed relation with the bolt rotating means for moving the box longitudinally, a plunger mounted in the box and adapted to be yieldably urged forward to advance the nut as the box is moved forward to move the bolt in position to be gripped by the bolt rotating means, and to feed the nut longitudinally of the bolt during the threading of the bolt into the nut, and means operatively connected between the nut moving means and the bolt rotating means for reversing the direction of rotation of the bolt after a predetermined advance of the nut with relation to the bolt.

Signed at Maywood, Calif., this 16th day of April, 1929.

ROBERT M. MORGAN.
STEPHEN W. HARDEN.